INVENTORS.
YOSHIO KIMURA
YUTAKA KASAMATSU
NORIAKI KAGAWA

BY Kurt Kelman
AGENT

United States Patent Office 3,303,322
Patented Feb. 7, 1967

---

3,303,322
HIGH-EFFICIENCY SEMI-AUTOMATIC CONTINU-
OUS ELECTRIC ARC WELDING
Yoshio Kimura and Yutaka Kasamatsu, Fujisawa, and
Noriaki Kagawa, Kamakura, Japan, assignors to Kobe
Steel Works, Ltd., Kobe, Japan
Filed Mar. 30, 1965, Ser. No. 443,885
Claims priority, application Japan, Apr. 2, 1964,
39/18,448
3 Claims. (Cl. 219—137)

The present invention relates to semi-automatic continuous electric arc welding, and particularly, to arc welding by means of coated welding rods.

It has been customary heretofore to connect each semi-automatic welding machine to an individual electric generator, and when one operator is responsible for several machines, he must check on the machines periodically and replace each welding rod or electrode that has been used up with a new one and strike an electric arc for the new rod. If the operator is responsible for many machines, it often happens during replacement of the rod on one machine, that the arc dies on one or more of the rods used up on other machines and, as a result, there is much down or non-operating time for each machine, resulting in low shop efficiency and higher production cost. It is another disadvantage of the prior art that, in setting a new welding rod and striking the electric arc, many workers do not use a safety helmet or hand shield because it is troublesome to do so. In order to protect his eyes against radiation when the tip of the welding rod is brought in contact with the base metal under applied voltage, the operator closes his eyes or turns his head away from the welding area. As a result, the welding rod may not be set properly, the circuit may be shorted, or the electric arc may not be started smoothly, causing extra work or a low quality weld.

It is one object of the present invention to eliminate the above-mentioned disadvantages of the known welding processes.

Another object of the present invention is to provide an electric arc welding rod which is useful for carrying out semi-automatic electrical arc welding processes in accordance with the present invention.

According to one feature of the present invention, two or more semi-automatic electric arc welding machines are connected in parallel circuit to one electric generator. When a new welding rod or electrode is inserted in one of the welding machines, an arc-delay material is contiguously interposed between the tip of the welding rod and the base metal of the work piece.

Other features of the present invention will become apparent from the following description in connection with the accompanying drawings, in which.

Figure 1:
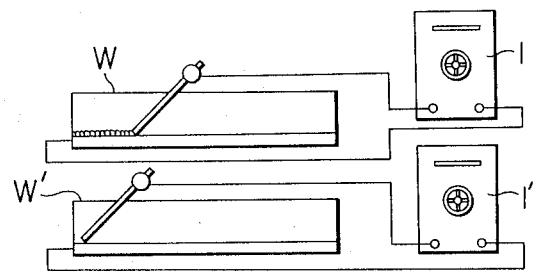
FIG. 1 shows prior art apparatus for the semi-automatic electric arc welding of two workpieces in a conventional manner.

Now, referring to FIG. 1, which shows a prior art arrangement, each of two semi-automatic welding machines W, W' is electrically connected to its individual generator 1, 1'. With this arrangement, if one operator is responsible for several semi-automatic welding machines, he must periodically check each welding machine in order to replace any spent welding rod with a new one and strike an arc to start operation of the machine.

Figure 2:
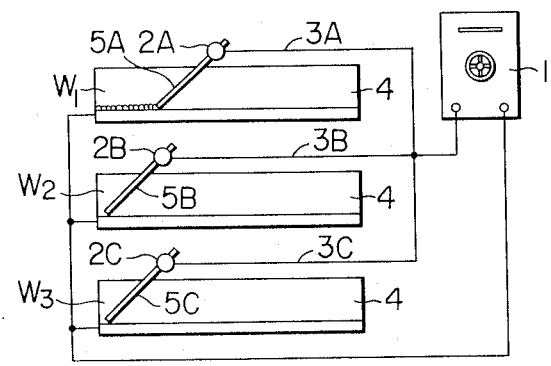
FIG. 2 shows apparatus for the semi-automatic electric arc welding of three workpieces in accordance with the present invention in a view corresponding to that of FIG. 1.

In the apparatus of the present invention shown in FIG. 2, conductors 3A, 3B, 3C connect the welding rod holders 2A, 2B, 2C of three semi-automatic welding machines $W_1$, $W_2$, $W_3$ to the high-voltage terminal of a single electric generator 1 whose other terminal is grounded as are the work pieces of base metal 4 which are to be welded on the three welding machines.

Figure 3A:
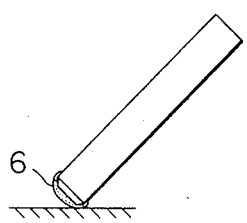
FIG. 3a shows a welding rod in accordance with the present invention, having a tip coated with arc-delay material.

In operating the apparatus of FIG. 2, a welding rod 5A is set in the welding rod holder 2A, and a weld in the associated base metal 4 is made. While this welding operation proceeds, welding rods 5B, 5C are set in the remaining holders 2B, 2C, and the arc-delay coating 6 is interposed between the base metals 4 and the tips of the associated welding rods 5B, 5C as shown in FIG. 3a. The coating 6 of the rods 5B, 5C differ in electrical conductivity. The arc-delay material prevents the formation of an electric arc at the tips of the welding rods 5B, 5C as long as the welding rod 5A is arcing. When the welding rod 5A is consumed, and its arc has died, an electric arc is automatically generated at the tip of one of the other welding rods 5B, 5C the arc delay material of which has the lower electrical resistance, and welding then proceeds at this second welding rod. Until the second welding rod is used up and its electric arc dies, no arc is generated at the third welding rod. While the second welding rod is arcing, new welding rods may be set in the machines where a welding rod has been used up, arc-delay material 6 being interposed between the tip of each newly inserted welding rod and the base metal. When this procedure is carried out properly, electric arcs are automatically and successively started, and the welding generator is utilized at 95–100% efficiency.

The electrical resistance of the coating 6 is selected in such a manner that it is overcome at the no-load voltage of the generator (generally 60–90 volts), but does not permit current flow under normal welding conditions when the voltage is generally 25–50 volts.

When the no-load voltage is applied to the material 6, a small electric current flows therethrough, and a non-conductive oxidizable component thereof is burnt, whereby the resistance of the material breaks down, and an electric arc is generated.

The substance 6 is a mixture of 5–60% electrically conductive components such as powdered iron, powdered iron alloy, graphite etc., 20–85% non-conductive components such as oxides, salts, etc., 3–20% readily oxidizable components such as organic materials, and 5–20% bonding agent such as water glass. The electrical resistance of the arc delay material should be such that the oxidizable component is burnt within 0.2–10 seconds after the no-load voltage is applied. Unless the electrically conductive components make up at least 5% of the total weight, it is difficult to start the electric arc while, if the electrically conductive components make up 60% of the total weight, an electric arc is generated immediately when the welding rod is set in place with the arc-delay material interposed between the tip of the rod and the base metal which causes undesirable results. The non-conductive component controls the electrical conductivity of the material and 20–85% thereof suffices for this purpose. The oxidizable component enables the arc-generating electric current to flow more freely by its burning, and at least 3% thereof is necessary, but a quantity exceeding 20% is unnecessary.

Examples of arc-delaying materials are shown in Table I.

TABLE I.—PERCENT BY WEIGHT IN BLEND

|  | A | B | C | D |
|---|---|---|---|---|
| Conductive components: | | | | |
| Graphite | 7 | 1 | 20 | 5 |
| Iron Power | 3 | 38 |  | 50 |
| FerroManganese | 1 | 6 | 5 |  |
| Ferro Silicon |  |  |  | 2 |
| Non-Conductive Components: | | | | |
| K Perchlorate | 65 | 5 | 55 | 10 |
| Kaolin | 5 | 19 |  |  |
| Mica | 6 | 13 |  |  |
| Talc |  |  | 5 | 13 |
| Oxidizable Components: | | | | |
| Starch |  |  | 5 | 10 |
| Dextrin | 3 | 2 |  |  |
| Gum Arabic |  | 5 |  |  |
| Bonding Agents, Water glass | 10 | 11 | 10 | 10 |

The time from contact of the coated welding rod with the base metal to the striking of an electric arc is shown in Table II below which lists the results of tests on sets of ten rods, each set being coated with a different blend from Table I.

TABLE II.—SECONDS

| Blend A | 3.8 | 3.0 | 4.5 | 4.8 | 3.5 | 4.8 | 3.7 | 3.4 | 4.3 | 4.0 |
|---|---|---|---|---|---|---|---|---|---|---|
| Blend B | 3.9 | 4.2 | 3.1 | 4.5 | 3.8 | 3.8 | 4.2 | 2.9 | 3.8 | 3.2 |
| Blend C | 0.4 | 0.6 | 0.7 | 0.6 | 0.6 | 0.7 | 0.5 | 0.7 | 0.9 | 0.5 |
| Blend D | 1.1 | 0.9 | 0.8 | 0.8 | 0.6 | 0.5 | 1.0 | 0.9 | 0.4 | 1.2 |

Figure 3B:
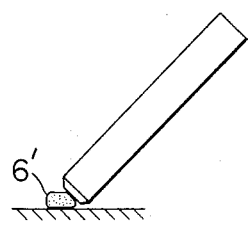
FIG. 3b shows the arc-delay material as separate body located between the tip of the welding rod and the base metal.

The arc-delay material may be applied to the welding rod as a coating covering the tip as shown in FIG. 3a. In the modified arrangement shown in FIG. 3b, the material forms a solid body 6' which is located between the tip of the welding rod and the base metal.

The following advantages are obtained by the present invention:

The operator can replace a spent welding rod with a new welding rod at any time while welding continues with another rod.

An electric arc is not started by the operator during the setting of the welding rod, but is generated automatically upon the dying of the arc at another welding rod which has been consumed with a corresponding reduction in hand labor and operator's fatigue.

Down time of the welding generator is reduced to a minimum, because an electric arc is struck at successive welding rods automatically and continuously. The welding generator is operated at 95–100% of capacity.

Therefore, the number of generators and semi-automatic welding machines which can be handled by one operator can be increased in accordance with the present invention.

What is claimed is:

1. A method of arc welding by means of a single generator having two terminals and a no-load voltage between said terminals substantially higher than the normal welding voltage thereof, which comprises:
    (a) conductively connecting a plurality of conductive welding electrodes to one of said terminals;
    (b) conductively connecting a plurality of conductive work pieces to the other terminal;
    (c) contiguously interposing a body of arc-delay material between one of said electrodes and a corresponding work piece,
        (1) the breakdown voltage of said body being lower than said no-load voltage and higher than said normal welding voltage; and
    (d) starting an electric arc between another one of said electrodes and an associated work piece, whereby welding current flows between said other electrode and said associated work piece.

2. A method as set forth in claim 1, wherein said one electrode is connected to said one terminal while said welding current flows between said other electrode and said associated work piece.

3. A method as set forth in claim 1, wherein another body of arc-delay material is contiguously interposed between a third one of said electrodes and one of said work pieces, said other body having an electrical resistance different from the electrical resistance of said first-mentioned body, said one electrode and said third electrode being connected to said one terminal and the respective bodies of arc-delay material being interposed between said one and third electrode and the respective work pieces while said welding current flows between said other electrode and said associated work piece.

References Cited by the Examiner

UNITED STATES PATENTS

| 1,301,331 | 4/1919 | Smith | 219—146 |
| 2,370,100 | 2/1945 | White | 117—203 |
| 2,453,950 | 11/1948 | Berge et al. | 219—130 |
| 2,472,923 | 6/1949 | Schwerber | 315—60 |
| 2,511,426 | 6/1950 | Bienfait et al. | 219—130 |

FOREIGN PATENTS

| 1,052,011 | 3/1959 | Germany |
| 501,721 | 3/1939 | Great Britain. |

RICHARD M. WOOD, *Primary Examiner.*